United States Patent [19]

Lin

[11] Patent Number: 4,943,878
[45] Date of Patent: Jul. 24, 1990

[54] ULTRA-COMPACT RECORDER

[76] Inventor: Yong-En Lin, 64-41 Saunder St., #610, Rego Park, N.Y. 11374

[21] Appl. No.: 314,775

[22] Filed: Feb. 28, 1989

Related U.S. Application Data

[63] Continuation-in-part of Ser. No. 166,561, Mar. 9, 1988.

[30] Foreign Application Priority Data

Jun. 16, 1987 [CN] China .................................. 87104137

[51] Int. Cl.$^5$ ..................... G11B 15/26; G11B 23/087
[52] U.S. Cl. ...................................... 360/90; 360/132; 360/96.3
[58] Field of Search ........................ 360/90, 96.3, 96.4, 360/132

[56] References Cited

U.S. PATENT DOCUMENTS

| | | | |
|---|---|---|---|
| 3,667,762 | 6/1972 | Scheid | 274/4 |
| 4,054,925 | 10/1977 | Towner et al. | 360/71 |
| 4,261,023 | 4/1981 | Hayashi | 360/94 |
| 4,388,660 | 6/1983 | Osanai | 360/110 |
| 4,472,751 | 9/1984 | Sato | 360/94 |
| 4,504,876 | 3/1985 | Nagaoka | 360/94 |
| 4,630,149 | 12/1986 | Ida | 360/96.4 |

Primary Examiner—Robert S. Tupper
Attorney, Agent, or Firm—Morgan & Finnegan

[57] ABSTRACT

An ultra compact recorder in which the drive motor is located within the central aperture of a tape reel. The motor shell functions as the axle around which the supply reel rotates. In the single reel embodiment the tape is non-interchangeable and coiled onto the supply reel in an endless loop, the tape being drawn from the interior of the coil and thereafter returned to the periphery. In a dual reel embodiment, the drive system may have rewind and fast-forward functions. In the cassette embodiment the two reel cassette may be removed and reattached at will.

19 Claims, 10 Drawing Sheets

ULTRA-COMPACT RECORDER

BACKGROUND OF THE INVENTION

1. Cross Reference To Related Applications

This application is a continuation-in-part application of U.S. patent application Ser. No. 07/166,561 filed Mar. 9, 1988.

2. Field of the Invention

This invention relates to a tape playing and recording apparatus and a method for reducing the size of such apparatus. More particularly, this invention relates to a drive system for an ultra compact tape recorder/player with a non-interchangeable tape recording medium and with an interchangeable tape cassette.

3. Description of the Prior Art

Most of the popularly sold tape recorders today use standard 2½"×4" audio tape cassettes. Nearly all audio tape recorders are designed so that the power transmission system is separated from the magnetic tape, i.e. the recorders are independent from the tape so as to allow for interchangeability of cassettes or reels. Although the smallest of these modern recorders are lightweight and portable, manufacturers are always trying to reduce the size of the recorders. However, there is a limit to size reduction of the housing of the recorders when using conventional tape cassettes or reels. The structure of such recorders inherently prevents microminiaturization.

One way which has been used to decrease the size of a recorder is to use a flat, thin motor whose plane is parallel to that of the cassette. For example, in U.S. Pat. No. 4,630,149, Ida uses a flat motor under the rewind reel gear of the cassette tape recorder. The axis of the motor shaft is normal to the motor plane.

Problems from such designs may arise from irregularities in the rotation of the motor shaft, such as precession and nutation, which result in wow or flutter. To some extent these problems may be alleviated by use of a belt driven flywheel to mask the irregularities, and by mounting the motor shaft in bearings spaced as far apart as possible, as Ida did.

Size reduction of conventional interchangeable cassette recorders is limited for two reasons. First, the motor must occupy a plane separate from that of the cassette. This takes up extra space no matter how thin the motor is. Furthermore, the thinner the motor is, the more irregular will be the rotation of the motor shaft. Curing this requires mounting the motor shaft in bearings spaced as far apart as possible to stabilize its rotation. This, of course, defeats the purpose of having a thin motor. Second, the conventional cassette is to be inserted into the recorder. Obviously the recorder must be larger than the cassette.

Using a tape drive system as disclosed by the present invention, however, allows one to put a motor in the same plane as the tape. Since the motor shaft does not have to extend far into a separate plane, one source of irregularity, i.e., the precession and nutation of the motor shaft, is almost eliminated. Furthermore, modern motor technology makes possible the design of micro motors with very little magnetic leakage beyond the motor shell. Hence, the tape may be placed as close as 2 to 3 millimeters away from the motor without suffering from magnetic interference.

Nowadays people are accustomed to conventional tape cassettes. However, there are many applications in which only a single reel tape needs to be played. Thus, an embodiment of the present invention teaches a non-interchangeable single reel tape player. Non-interchangeable tape recorders may be used in scientific research or data collection, industry, education, audio greeting cards, voice recordings of books for the blind, language lessons, toys, advertisements, recorded commentaries for exhibitions and museums, etc. For such applications a recorder, less than 10 millimeters thick, much smaller than the standard size audio tape cassette, is desirable.

It is also desirable to use an interchangeable cassette tape system wherein many cassette tapes may be applied to one compact player/recorder with reduced drive irregularity.

SUMMARY OF THE INVENTION

According to one feature of this invention an ultra compact recorder includes a motor concentrically located inside the central aperture of a tape reel such that the outer shell of the motor acts as the axle around which the tape reel may rotate. In one embodiment, the tape is wound around the reel and the ends are joined so as to form an endless loop. In this embodiment a single reel is used.

The tape is drawn from the interior of the winding and returned to the outside of the winding. The motor drives a flywheel by belt, which in turn rotates the capstan. The entire assembly may be placed between two printed circuit boards which comprise the housing.

In another feature of this invention two non-interchangeable reels are used and the tape can be rewound.

In yet another feature of this invention, an ultra compact recorder allows a cassette to be introduced so that the motor is concentrically located inside the central aperture of one of two tape reels. The cassette is constructed to be removable and re-attachable to the drive system while still holding the tape reels spatially in place. Thus, when the cassette is placed in the recorder, the driving motor will be located within the central aperture of one of the tape reels.

The tape is connected at one end to the first tape reel, and at the other end to the second tape reel. The tape is wound partially around each reel, and is drawn along a path between the two.

The motor drives one or a series of flywheels by belt, each flywheel rotating a capstan which directly drives the tape.

The belt also drives one or a series of shift wheels thereby indirectly rotating a passing idler, which frictionally drives one of the tape reels.

Apertures are made in the cassette case which allow the motor to fit into place. Cuts, notches and holes into the cassette case are provided to allow the driving components attached to the tape player to drive the tape and allow the sensory heads to affect or sense the tape.

Accordingly, it is an object of this invention to provide an ultra compact tape recorder.

It is a further object of this invention to provide a tape recorder with non-interchangeable tape.

It is yet a further object of this invention to provide an interchangeable cassette, ultra compact tape recorder which still allows the tape reel to rotatably surround the motor housing.

These and other objects, features, and advantages of the present invention will become apparent when the following detailed description of the preferred embodiments is considered along with the drawings.

DETAILED DESCRIPTION OF THE PREFERRED EMBODIMENTS

Figure 1:
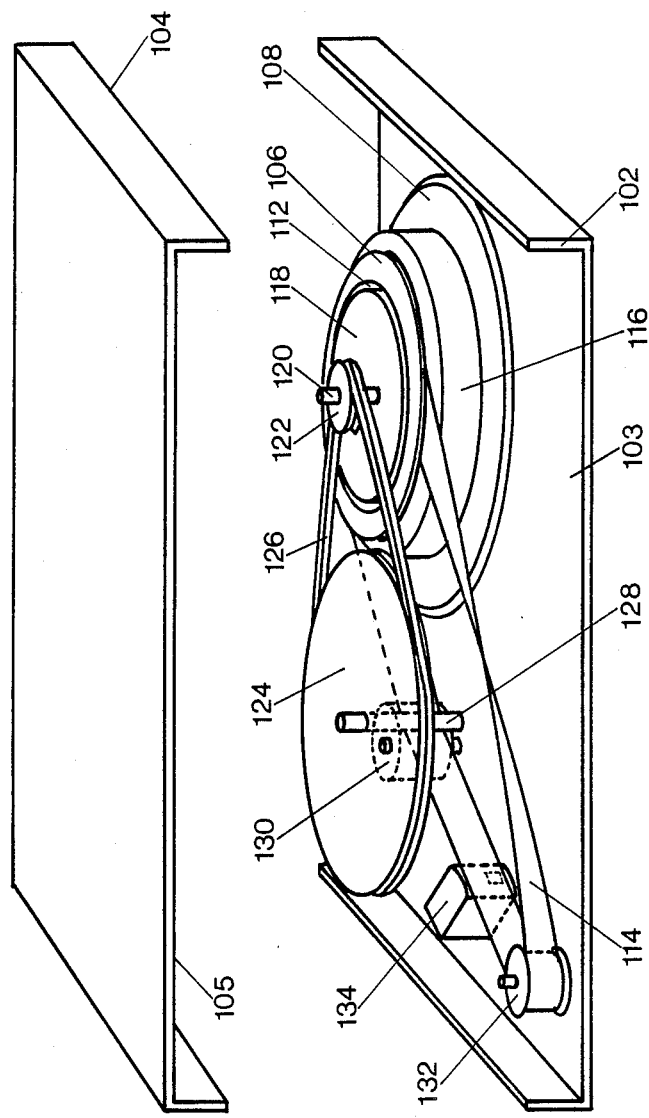
FIG. 1 is a perspective view of the interior of the ultra compact recorder.
Figure 2:
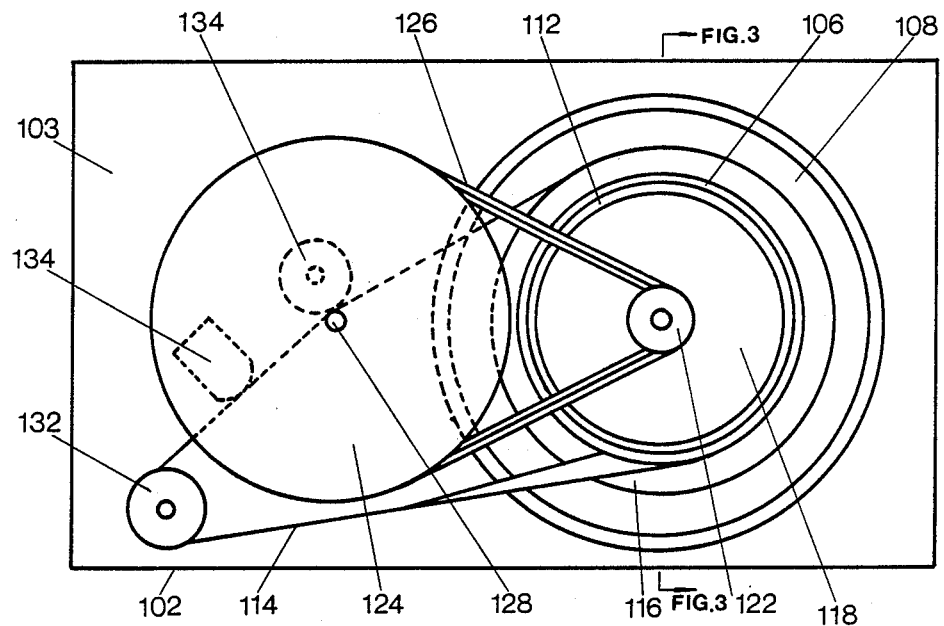
FIG. 2 is view of the drive system for the ultra compact recorder.
Figure 4:
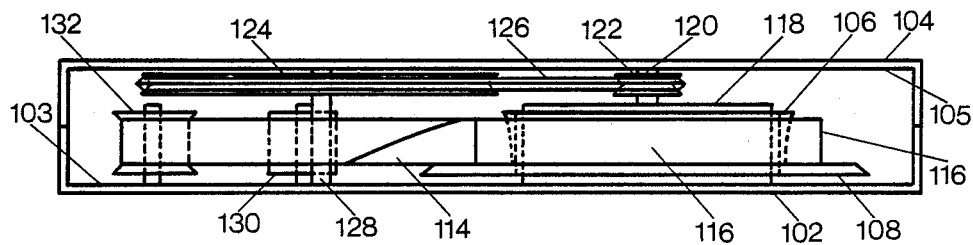
FIG. 4 is a side view of the drive system for the ultra compact recorder.

FIGS. 1, 2, and 4 illustrate the drive system for a single reel ultra compact recorder using an endless tape loop as the recording medium. In this embodiment of the present invention the drive system is enclosed between a housing base 102 and a housing cover 104 which are attached to each other. The housing base 102 and cover 104 can be made from printed circuit boards which contain on their inside surfaces 103, and 105 respectively, the electronic circuitry and components for processing signals to be recorded and reproduced. Typically, such circuits are etched in copper glance.

In this embodiment the printed circuit boards may comprise the housing which encloses the drive system of the ultra compact recorder and the areas of the printed circuit boards unoccupied by the components of the drive system may contain the electronic circuitry. Very few suspended wires are needed. Therefore, space is used more efficiently and the recorder may be built smaller.

One embodiment of this invention uses as the recording medium a magnetic tape 114 with both ends attached to each other so as to form an endless loop. The tape 114 is wound into a coil 116. Circular supply reel 106 supports the tape coil 116 and it is rotatably mounted around motor 118. The supply reel 106 can be made of any durable light polymer resin.

Supply reel 106 has a base 108 extending radially from the axis of the reel and supports the tape coil winding 116. Supply reel 106 has a cylindrically shaped central aperture 112 extending axially. The aperture 112 is wide enough to allow a motor 118 to be concentrically located within it.

Motor 118 is fixed to the housing base 102. It is cylindrically shaped and fits almost entirely within the aperture 112. Having supply reel 106 rotatably mounted on the motor 118 results in saving a considerable amount of space. When the motor 118 doubly functions as an axle for the reel, the recorder need only be slightly larger than the width of the tape 114.

The motor 118 has a shaft 120. Pulley 122 is coaxially mounted on the motor shaft 120. Driving belt 126 extends around pulley 122 and flywheel 124, and transmits rotary motion from the pulley 122 to the flywheel 124. The flywheel 124 and pulley 122 extend laterally in a plane above that of the motor 118, tape 114, and reel 106. The flywheel 124 is of relatively large diameter so as to smooth out any irregularities of motion. It overlaps the supply reel 106 without interfering with the circulation of tape 114 through the drive system.

Capstan 128 is fixedly attached to the center of the flywheel 124 and extends along a common axis such that the rotation of the flywheel 124 is transmitted to the capstan 128. Capstan 128 can be rotatably mounted at both ends in housing base 102 and housing cover 104.

Rotating capstan 128 engages the tape recording medium 114 and moves it past the head 134. Tape 114 is pressed against the capstan 128 by pinch roller 130, which is rotatably mounted on the housing base 102 and biased towards capstan 128 by a conventional spring means.

Idler wheel 132 is rotatably mounted on the housing base 102 and guides the tape 114 past the head 134.

Head 134 is fixedly mounted on the housing base 102 and is positioned between idler 132 and capstan 128 such that the tape 114 can receive or playback signals as it moves past the recording face of the head 134.

In operation, endless tape 114 is drawn from the interior of the coil 116. It is moved at a constant speed around idler guide wheel 132, past the head 134 where signals are recorded or read, and between capstan 128 and pinch roller 130, whereupon it is returned to the periphery of the coil 116. Supply reel 106 freely rotates around motor 118 when the tape 114 is being drawn, thereby allowing the tape 114 to move through the recorder. Because the tape 114 is an integral part of the system and is in the form of an endless loop, only a single reel is necessary. Tape 114 is automatically returned to supply reel 106 without the need for a separate take-up reel.

Figure 3:
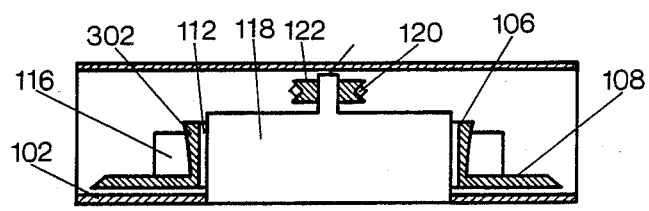
FIG. 3 is a sectional view of the motor and tape reel assembly of the ultra compact recorder as shown in FIG. 2.

FIG. 3 is a sectional view of the motor and supply reel assembly shown in FIG. 2. The inner wall 302 of the supply reel 106 provides lateral support to the coil winding 116 and also defines the central aperture 112.

To facilitate the removal of the tape 114 as it is being drawn from the interior of the coil winding 116, the inner wall 302 of the supply reel 106 for the single reel recorder may be tapered such that the angle formed by the surface of wall 302 and the radially extending base 108 is less than a right angle.

Figure 5:
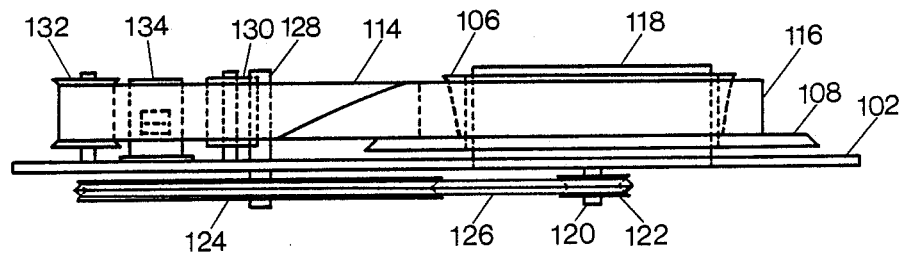
FIG. 5 is a wide view of an alternative embodiment of the drive system for the ultra compact recorder.

FIG. 5 illustrates an alternative embodiment of the single reel ultra compact recorder. In this embodiment the flywheel 124, pulley 122, and driving belt 126 are in a plane below that of the base 102. The advantage to this embodiment is that it permits easier access to the tape 114 and supply reel 106 in case the tape needs to be removed or replaced, as in a conventional recorder.

Figure 6:
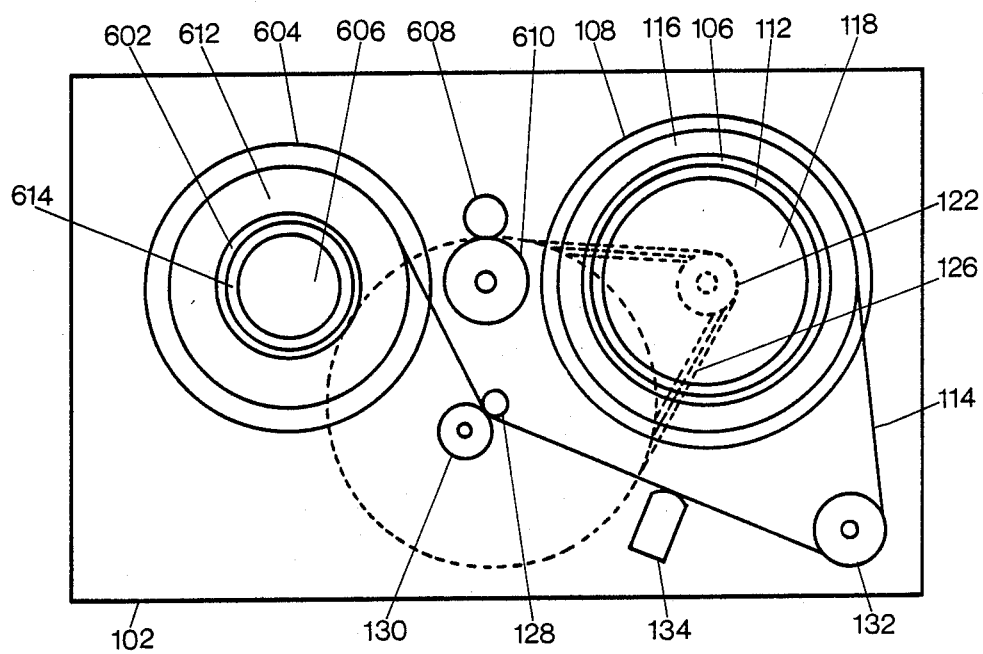
FIG. 6 is a top view of a dual reel embodiment of the ultra compact recorder drive system.
Figure 7:
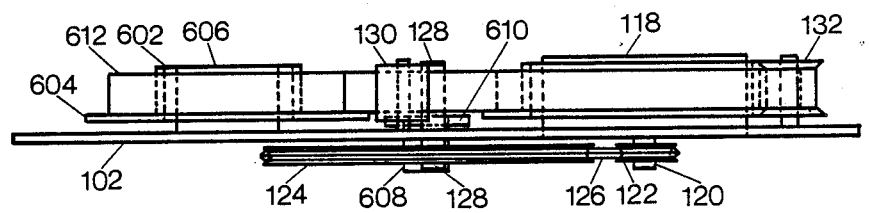
FIG. 7 is a side view of the dual reel embodiment of the ultra compact recorder drive system.

In an alternative embodiment two reels may be used, thereby allowing fast-forward operation and reverse. FIGS. 6 and 7 illustrate a dual reel ultra compact recorder. As in the previously described embodiment of the invention, motor 118 may be located in the central aperture of supply reel 106. The tape 114 is wound in a coil 116. Unlike the previously described embodiments, tape 114 is not endless. The two ends of the tape are attached to the supply reel 106 and the take-up reel 602, not to each other. Instead of being drawn from the interior of coil 116 and returned to the periphery thereof, it is drawn from the periphery of coil winding 116 on the supply reel 106 and wound onto the periphery of coil winding 612 on take-up reel 602.

Take-up reel 602 has a base 604 for supporting the tape coil 612, an axially extending central aperture 614, and is rotatably mounted on axle 606. In the dual reel embodiment a motor may be placed in either, or both of the two reels. Therefore, the axle 606, which is located in central aperture 614 of the take-up reel 602 may be replaced by motor 118, or an additional motor for other purposes.

If the take-up reel 602 is rotatably mounted on motor 118, then the driving belt 126 must be repositioned accordingly. Rewind and fast-forward functions may be carried out by conventional means such as passing idler 608 and shift wheel 610. Passing idler 608 contacts driving belt 126 below housing base 102 and transmits motion from the driving belt 126 to shift wheel 610, which it contacts at a point above the housing base 102. The position of shift wheel 610 may be changed by conventional switching means so that it contacts either the supply reel 106 for rewind operation, or take-up reel 602 for fast-forward operation.

Figure 8:
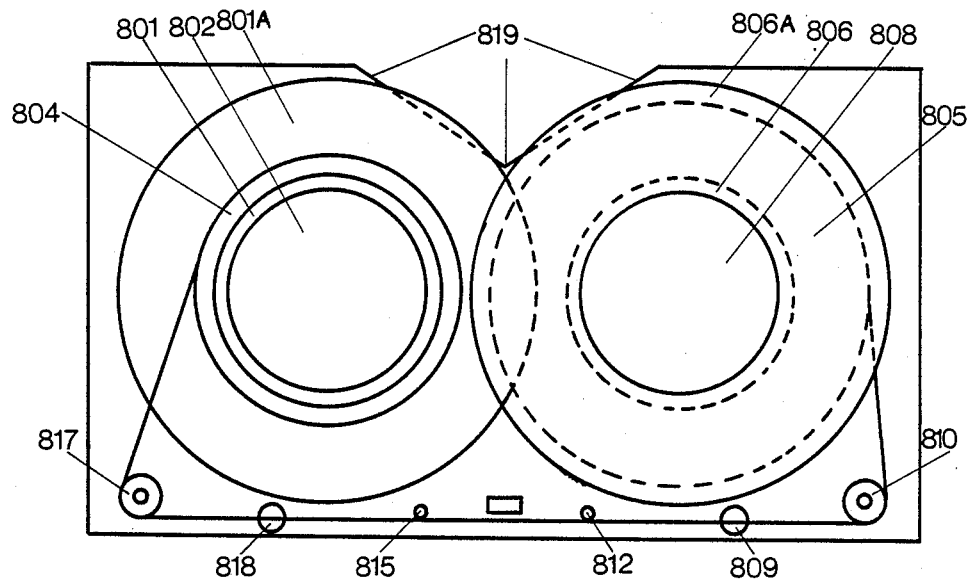
FIG. 8 is a top view of an embodiment of a dual reel tape cassette to be used in an ultra compact recorder cassette drive system.
Figure 8A:
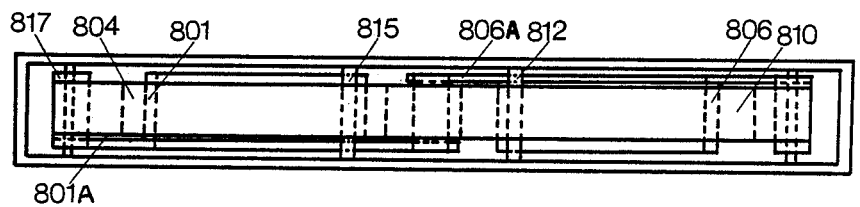
FIG. 8A is a side view of the dual reel tape cassette embodiment shown in FIG. 8.

FIGS. 8 and 8A illustrate an embodiment for a dual reel tape cassette used in an ultra compact tape recorder cassette drive system as taught by the present invention. The circular tape reels 801 and 806 surround two central apertures 802 and 808, respectively. The central apertures 802 and 808 pass through the cassette, may be identical in size, and are large enough in diameter to fit a tape recorder drive motor.

Figure 11A:
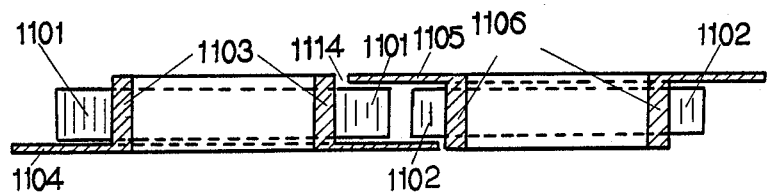
FIG. 11A is a cross-sectional illustration of an inverted tape reel embodiment of a tape cassette.
Figure 11B:
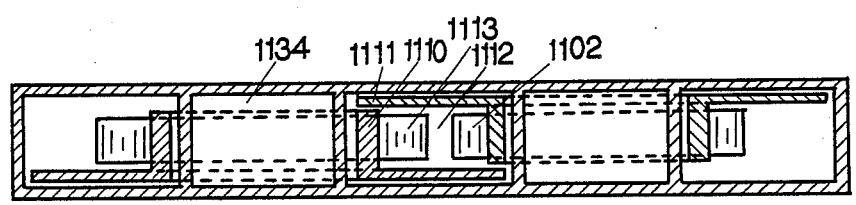
FIG. 11B is a cross-sectional illustration of a further inverted tape reel embodiment of a tape cassette.
Figure 11C:
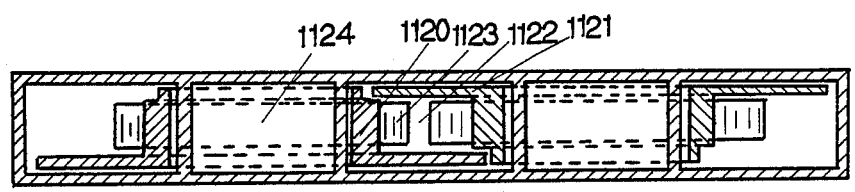
FIG. 11C is a cross-sectional illustration of a further inverted tape reel embodiment of a tape cassette.

Audio tape 804 and 805 is wound around the two tape reels 801 and 806, respectively. In this embodiment the tape reels are inverted. As illustrated in FIG. 11A, the tape reel bases 1104 and 1105 are reversed to conserve space and allow for a more compact cassette. Tape 1101, 1102 is wound around the tape reels 1103, 1106 respectively. The tape cassette reel placement, as illustrated in FIGS. 11B and 11C, will be discussed further below.

In FIG. 8, reel 806 is considered the supply reel and reel 801 is considered the take-up reel, the audio tape 805 runs off of the supply reel 806, around idler wheel 810 to idler wheel 817 and onto take-up reel 801. Between idler wheels 810 and 816 the tape is held in place by tape axles 812 and 815.

Notch 819 allows access for a drive system to frictionally drive tape reel bases 801A and 806A. Holes 809 and 818 allow access for capstans from a drive system to directly drive the audio tape.

Figure 9:
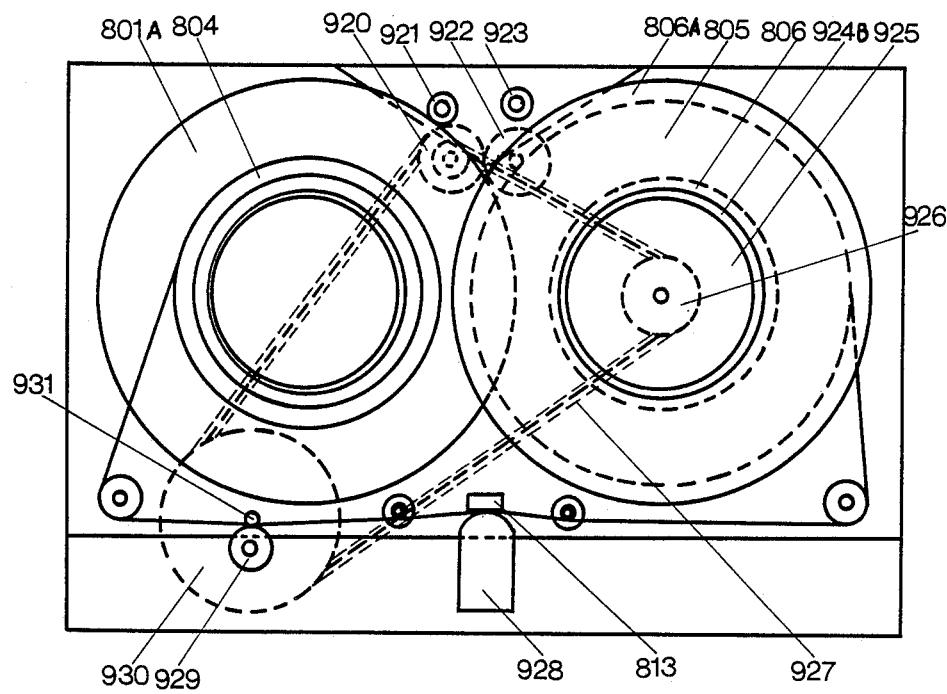
FIG. 9 is a top view of an embodiment of an ultra compacted tape recorder cassette drive system which utilizes the cassette illustrated in FIGS. 8 and 8A.

FIG. 9 illustrates an embodiment of an ultra compact tape recorder cassette drive system engaging the cassette illustrated in FIG. 8. In this embodiment, the cassette may only be played when the tape is flowing in one direction, however the tape may also be fast-forwarded or rewound.

When the tape cassette is attached, motor 925 fits into tape reel central aperture 924B. The motor causes pulley 926 to rotate, which drives driving belt 927. Driving belt 927 extends around pulley 926, fly wheel 930 and shift wheel 920, and transmits rotary motion from pulley 926 to fly wheel 930 and shift wheel 920.

Figure 9A:
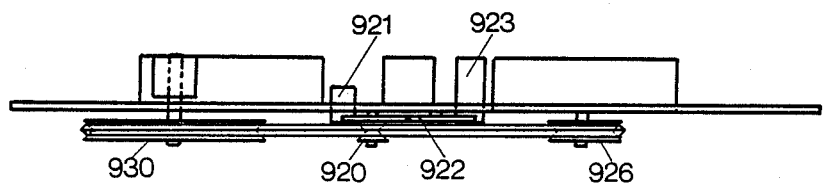
FIG. 9A is a side view of the drive system embodiment shown in FIG. 9.

As illustrated in FIG. 9A, fly wheel 930, shift wheel 920 and pulley 926 extend laterally in a plane below that of motor 925 and all cassette components. This places driving belt 927 below the cassette plane, and allows the cassette to be removed and re-attached freely from above.

Capstan 931 is fixedly attached to the center of fly wheel 930 such that the rotation of the fly wheel 930 is transmitted to the capstan 931. FIG. 9 illustrates how capstan 931 engages the tape medium when pinch roller 929 presses against the capstan. When capstan 931 rotates, a pulling force moves the tape past sensory head 928.

As shown in FIG. 9A, shift wheel 920 is constructed in such a way that driving belt 927 rotates shift wheel 920 in a plane slightly below that where shift wheel 920 makes frictional contact with both shift wheel 922 and passing idler 921. Thus driving belt 927 indirectly imparts a rotating force to both shift wheel 922 and passing idler 921.

Passing idler 921 extends up to the plane of tape reel base 801A (shown in FIG. 9) where idler 921 engages base 801A. In this way tape reel base 801A is caused to rotate and wind the tape 804. Passing idler is constructed in a manner known to those skilled in the art so that it is spring loaded, and will not allow slack to form in the tape path.

When this embodiment is in the play mode, sensory head 928, pinch roller 929 and passing idler 921 engage their respective parts. Passing idler 921 makes frictional contact with shift wheel 920 and tape reel base 801A. Pinch roller 929 presses against rotating capstan 931, and sensory head 928 presses against spring part 813.

When the tape drive system is not in its play mode, sensory head 928, pinch roller 929 and passing idler 921 are retracted and do not engage the tape cassette mechanism.

When the tape is not in the play mode, but in a fast-forward mode, the motor 925 may be stepped-up in speed or pinch roller 929 is retracted. In this way the driving belt 927 will transmit faster rotary motion to the flywheel 930 and the shift wheel 920. In this mode, the sensory head 928 is not engaged.

When this embodiment of the ultra compact tape recorder cassette drive system is used in the rewind mode, sensory head 928, passing idler 921 and pinch roller 929 are retracted and the passing idler 923 is engaged.

In the rewind mode the motor 925 through shift wheel 920, causes the idler 923 and shift wheel 922 to rotate the tape reel 806A in an opposite direction than that in the forward mode. Flywheel 930 still engages all parts as it did in the fast forward mode. The tape is pulled in an opposite direction.

The shift wheel 920 imparts a driving force to the tape in a different manner in the reverse mode than in the forward mode. In the reverse mode the shift wheel 920 frictionally rotates a second shift wheel 922 which in turn makes frictional contact with a second passing idler 923. The passing idler 923 extends from the plane below the motor up to the plane where the tape reel base 806A is located. In this way passing idler 923 can transmit rotary motion from shift wheel 922 to tape reel base 806A. This causes tape 805 to wind around tape reel 806.

When the drive system is taken out of the rewind mode, the passing idler 923 and pinch roller 929 retract so that they do not engage the cassette mechanism.

In the recording mode the drive system interacts with the cassette in the same manner as in the playback mode, however the sensory head 928 affects or encodes the tape instead of sensing or decoding the tape.

Figure 10:
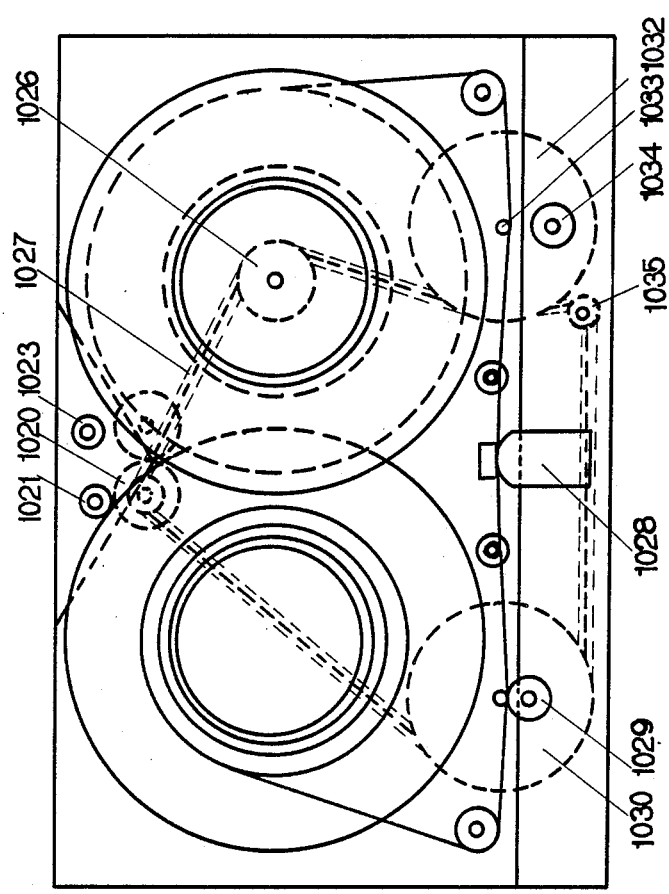
FIG. 10 is a top view of an alternative embodiment of a ultra compact tape recorder cassette drive system utilizing the tape cassette embodiment illustrated in FIGS. 8 and 8A.

FIG. 10 illustrates an alternative embodiment of an ultra compact tape recorder drive system which engages the cassette shown in FIG. 8. In this embodiment the drive system is able to play from, and record onto, the tape while the tape is driven in either direction.

In this drive system, transmission belt 1027 extends around pulley 1026, flywheel 1032, supply pulley 1035, flywheel 1030 and shift wheel 1020. Rotating force is thereby imparted to flywheels 1032, 1030 and shift wheel 1020.

Fly wheel 1030 and shift wheel 1020 engage equivalent parts and operate in an equivalent manner to that shown in the embodiment illustrated in FIGS. 9 and 9A for parts 930 and 920, respectively.

Pulley 1035 engages the driving belt 1027 so that the driving belt 1027 will impart a rotating force to the flywheel 1032 in the necessary direction. Flywheel 1032 causes capstan 1033 to rotate. When the tape is in the play-reverse mode pinch roller 1034 presses up against capstan 1033, and imparts a pulling force on the tape in the direction of tape reel 806, i.e. capstan 1033 and flywheel 1032 rotate in a counter clockwise manner.

In this embodiment sensory head 1028 is constructed in a way known in the art so that it will record or playback the tape when the tape is either in the play-forward or play-reverse mode.

In the play-forward mode, sensory head 1028, pinch roller 1029 and passing idler 1021 engage their respective parts, and passing idler 1023 and pinch roller 1034 are retracted.

In the play-reverse mode, sensory head 1028, pinch roller 1034, and passing idler 1023 engage their respective parts, and passing idler 1021 and pinch roller 1029 are retracted.

In the record-forward and record-reverse modes the components 1028, 1029, 1034, 1021 and 1023 are operated in a manner equivalent to the play-forward and play-reverse modes, respectively, however sensory head 1028 will encode the audio tape instead of decoding the audio tape.

In the fast-forward mode, sensory head 1028, pinch roller 1034, passing idler 1023 and pinch roller 1029 are retracted, and passing idler 1021 engage their respective parts and impart force. Pinch roller 1029 may engage its respective parts if the motor is stepped-up in speed.

In the fast-reverse mode sensory head 1028, pinch roller 1029, passing idler 1021 and pinch roller 1034 are retracted, and passing idler 1023 engage their respective parts and impart force. Pinch roller 1034 may engage its respective parts if the motor is stepped-up in speed.

Figure 12:
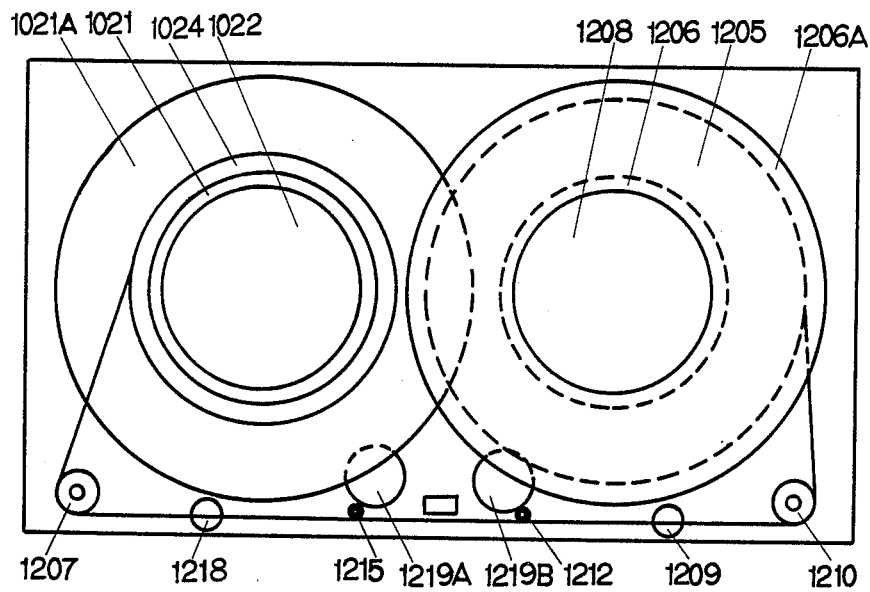
FIG. 12 is a top view of an alternative embodiment of a dual reel tape cassette for use in an ultra compact tape recorder cassette drive system.
Figure 12A:
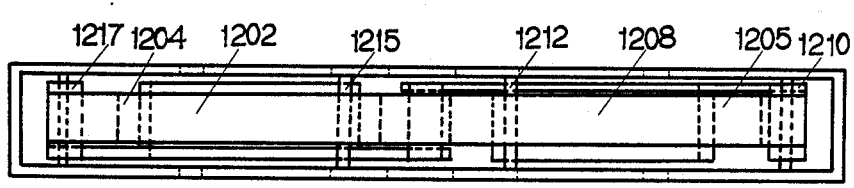
FIG. 12A is a side view of the tape cassette embodiment shown in FIG. 12.

FIGS. 12 and 12A illustrate a further embodiment for a dual reel tape cassette used in an ultra compact tape recorder cassette drive system as taught by the present invention. The circular tape reels 1201 and 1206 surround two central apertures 1202 and 1208, respectively. The central apertures 1202 and 1208, which may be identical in size, pass through the cassette and are large enough in diameter to fit a tape recorder drive motor.

Audio tape 1204 and 1205 is wound around the two tape reels 1201 and 1206, respectively. In this embodiment the tape reels are also inverted as illustrated in FIG. 11A to conserve space and allow for a more compact cassette.

If reel 1206 is considered the supply reel and reel 1201 is considered the take-up reel, the audio tape 1205 runs off of the supply reel 1206, around idler wheel 1210 to idler wheel 1217 and onto take-up reel 1201. Between idler wheels 1210 and 1217 the tape is held in place by tape axles 1212 and 1215.

Access holes 1219A and 1219B allow access for a drive system to frictionally drive tape reel bases 1201A and 1206A. Holes 1209 and 1218 allow access for capstans from a drive system to directly drive the audio tape.

Figure 13:
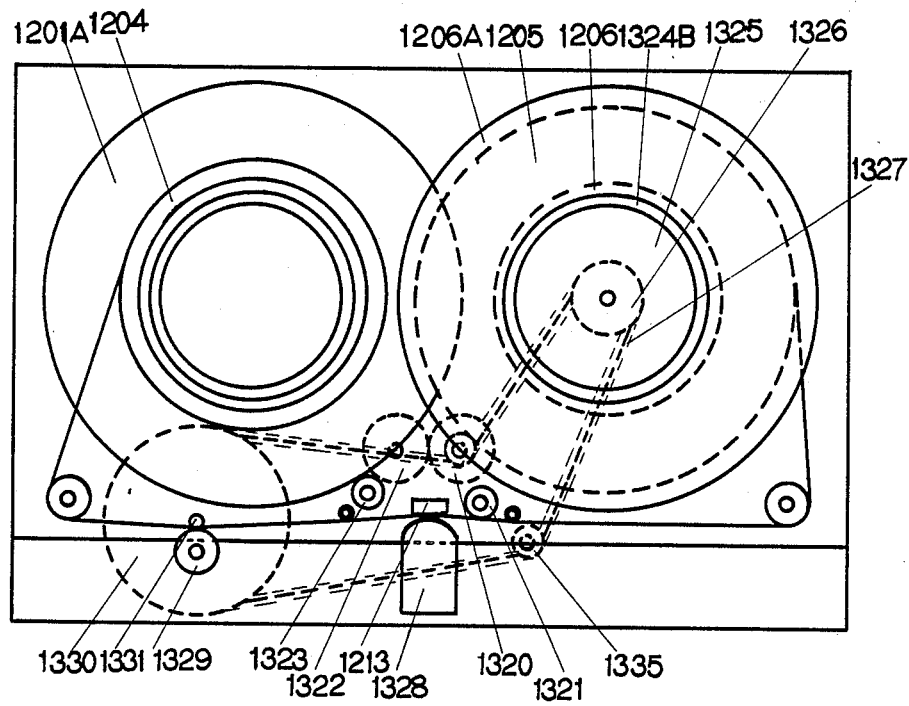
FIG. 13 is a top view of an embodiment of an ultra compact tape recorder cassette drive system utilizing the cassette illustrated in FIGS. 12 and 12A.

FIG. 13 illustrates an embodiment of an ultra compact tape recorder cassette drive system engaging the cassette illustrated in FIG. 12. In this embodiment the cassette may only be played when the tape is flowing in one direction, however the tape may also be fast-forwarded or rewound.

When the tape cassette is attached, motor 1325 fits into tape reel central aperture 1324B. The motor causes pulley 1326 to rotate, which drives driving belt 1327. Driving belt 1327 extends around pulley 1326, around supply pulley 1335, around fly wheel 1330 and around shift wheel 1320, and transmits rotary motion from pulley 1326 to fly wheel 1330 and shift wheel 1320.

Figure 13A:
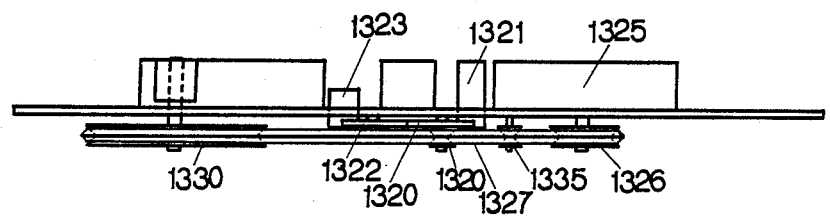
FIG. 13A is a side view of the drive system illustrated in FIG. 13.

As illustrated in FIG. 13A, fly wheel 1330, supply pulley 1335, shift wheel 1320 and pulley 1326 extend laterally in a plane below that of motor 1325 and all cassette components. This places driving belt 1327 below the cassette plane, and allows the cassette to be removed and re-attached freely from above.

Capstan 1331 is fixedly attached to the center of fly wheel 1330 such that the rotation of the fly wheel 1330 is transmitted to the capstan 1331. FIG. 13 illustrates how capstan 1331 engages the tape medium when pinch roller 1329 presses against the capstan. When capstan 1331 rotates, a pulling force moves the tape past sensory head 1328.

As shown in FIG. 13A, shift wheel 1320 is constructed in such a Way that driving belt 1327 rotates shift wheel 1320 in a plane slightly below that where shift wheel 1320 makes frictional contact with both shift wheel 1322 and passing idler 1323. Thus driving belt 1327 indirectly imparts a rotating force to both shift wheel 1322 and passing idler 1323.

Passing idler 1323 extends up to the plane of tape reel base 1201A (shown in FIG. 13) where idler 1323 engages base 1201A. In this way tape reel base 1201A is caused to rotate and wind the tape 1204. Passing idler 1323 is constructed in a manner known to those skilled in the art so that it is spring loaded, and will not allow slack to form in the tape path.

When this embodiment is in the play mode, sensory head 1328, pinch roller 1329 and passing idler 1323 engage their respective parts. Passing idler 1323 makes frictional contact with shift wheel 1322 and tape reel base 1201A. Pinch roller 1329 presses against rotating capstan 1331, and sensory head 1328 presses against spring part 1213.

When the tape drive system is not in its play mode, sensory head 1328, pinch roller 1329 and passing idler 1323 are retracted and do not engage the tape cassette mechanism.

When the tape is not in the play mode, but in a fast-forward mode, the passing idler 1323 may be engaged or the motor 1325 may be stepped-up in speed. In this way the driving belt 1327 will transmit faster rotary motion to the flywheel 1330 and the shift wheel 1320. In this mode, the sensory head 1328 is not engaged.

When this embodiment of the ultra compact tape recorder cassette drive system is used in the rewind mode, the sensory head 1328, the passing idler 1323 and the pinch roller 1329 are retracted, and the passing idler 1321 is engaged.

In the rewind mode the motor 1325 causes the tape reel 1206A to rotate in an opposite direction than that in the forward mode. Flywheel 1330 engages all parts as it did in the fast forward mode, and passing idler 1321 and shift wheel 1322 cause tape reel 1206A to rotate in an opposite direction. This pulls the tape in an equally opposite direction.

The shift wheel 1320 imparts a driving force to the tape in a different manner in the reverse mode than in the forward mode. In the reverse mode the shift wheel 1320 makes frictional contact with passing idler 1321. The passing idler 1321 extends from the plane below the motor up to the plane where the tape reel base 1206A is located. In this way passing idler 1321 can transmit rotary motion from shift wheel 1320 to tape reel base 1206A. This causes tape 1205 to wind around tape reel 1206.

When the drive system is taken out of the rewind mode, the passing idler 1321 and pinch roller 1329 retract so that they do not engage the cassette mechanism.

In the recording mode the drive system interacts with the cassette in the same manner as in the playback mode, however the sensory head 1328 affects or encodes the tape instead of sensing or decoding the tape.

Figure 14:
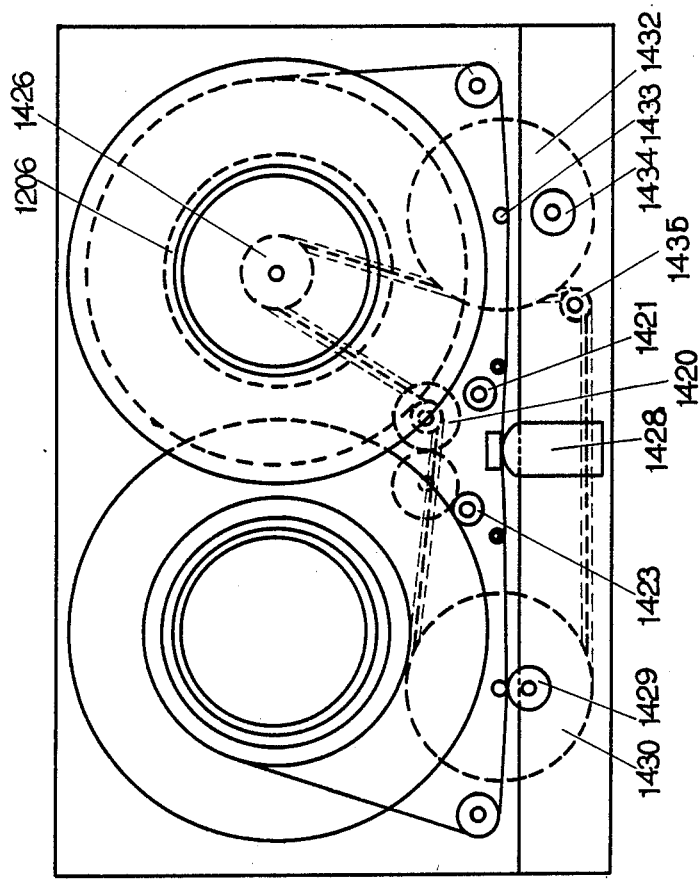
FIG. 14 is an alternative embodiment of an ultra compacted tape recorder cassette drive system which utilizes the cassette illustrated in FIGS. 12 and 12A.

FIG. 14 illustrates an alternative embodiment of an ultra compact tape recorder drive system which engages the cassette shown in FIGS. 12 and 12A. In this embodiment the drive system is able to play from, and record onto, the tape while the tape is driven in either direction.

In this drive system, transmission belt 1427 extends around pulley 1426, flywheel 1432, supply pulley 1435, flywheel 1430 and shift wheel 1420. Rotating force is thereby imparted to flywheels 1432, 1430 and shift wheel 1420.

Fly wheel 1430 and shift wheel 1420 engage equivalent parts and operate in an equivalent manner to that shown in the embodiment illustrated in FIG. 13 for parts 1330 and 1320, respectively.

Pulley 1435 engages the driving belt 1427 so that the driving belt 1427 will impart a rotating force to the flywheel 1432 in the necessary direction. Flywheel 1432 causes capstan 1433 to rotate. When the tape is in the play-reverse mode pinch roller 1434 presses up against capstan 1433, and imparts a pulling force on the tape in the direction of tape reel 1206.

In this embodiment sensory head 1428 is constructed in such a way known in the art that it will record or play-back the tape when the tape is playing in the play-forward or play-reverse mode.

In the play-forward mode, sensory head 1428, pinch roller 1429 and passing idler 1423 engage their respective parts, and passing idler 1421 and pinch roller 1434 are retracted.

In the play-reverse mode, sensory head 1428 pinch roller 1434, and passing idler 1423 engage their respective parts, and passing idler 1423 and pinch roller 1429 are retracted.

In the record-forward and record-reverse modes the components 1428, 1429, 1434, 1421 and 1423 are operated in a manner equivalent to the play-forward and play-reverse modes, however sensory head 1428 will encode the audio tape instead of decoding the audio tape.

In the fast-forward mode, sensory head 1428, pinch roller 1434, passing idler 1421 and pinch roller 1429 are retracted, and passing idler 1423 engages its respective parts and impart force.

In the fast-reverse mode sensory head 1428, pinch roller 1429, passing idler 1423 and pinch roller 1434 are retracted, and passing idler 1421 engages its respective parts and impart force.

FIGS. 11A, 11B and 11C illustrate a tape reel configuration which preserves space in an ultra compact tape recorder cassette. As shown above with respect to FIG. 11A, tape reel bases 1104 and 1105 are inverted. This inversion allows the tape reel bases to overlap instead of lay side by side. A tape reel base inversion therefore diminishes the lengthwise dimension and allows the cassette width to depend only upon motor thickness and tape thickness. This allows for a more ultra compact cassette and enhances space considerations.

FIGS. 11B and 11C illustrate two embodiments for cassettes utilizing this tape reel space configuration. Both FIGS. 11B and 11C are cross sectional views of an actual cassette embodiment which may be used in an ultra compact tape cassette recorder as taught by the present invention.

Both embodiments shown in FIGS. 11B and 11C also illustrate the second problem solved by the present invention when using an inverted tape reel design.

As illustrated in FIG. 11B the height of tape reel 1110 is decreased and the end of tape reel base 1111 is caused to overlap tape reel 1110. This forces tape 1113 wound around the tape reel 1110 to stay in the space 1112.

The embodiment in FIG. 11B eliminates the space 1114 illustrated in FIG. 11A. When the tape is wound using the embodiment of FIG. 11A it may wind into space 1114 causing a malfunction of the cassette winding. By eliminating this space 1114 as shown by the embodiments illustrated in FIG. 11B and 11C the tape is forced to stay in space 1112 and no malfunction is allowed to happen. The different configurations of FIGS. 11B and 11C illustrate how tape reels may be held in place in the cassette and the inventive aspects of tape reel base inversion and tape placement forcing may be combined.

In the embodiment illustrated by FIG. 11C, tape reel 1120 corresponds to tape reel 1110 in FIG. 11B, tape reel base 1121 corresponds to tape reel base 1111 in FIG. 11B, tape 1123 corresponds to tape 1113 in FIG. 11B, and space 1122 corresponds to space 1112 in FIG.

11B. In the cross sectional diagrams of the cassette embodiments the central aperture, where a tape drive motor will fit, is indicated by 1134 in FIG. 11B and 1124 in FIG. 11C.

While the above description contains many specifics, it should not be construed as limiting the invention, but merely as exemplifications thereof. Those skilled in the art will envision many other possible variations that are within its scope. For example, the drive system for the ultra compact recorder may also be used in video as well as audio recorders. Various materials of construction may be used, such as plastic or metal. The tape may record signals by means other than magnetism. Accordingly, the scope of the invention is to be determined by the appended claims and their legal equivalents, and not by the examples which have been given.

I claim:

1. An apparatus for recording and reproducing signals on a tape medium wherein the drive system comprises a tape reel with a central aperture, a flat disc shaped motor mounted coaxially within the central aperture of the tape reel.

2. An apparatus for recording and reproducing signals according to claim 1, wherein an endless tape is wound in a coil on the tape supply reel, said supply reel having a wall for supporting the inner surface of the tape coil, a base extending radially from the wall, and an axially extending central aperture, said tape being drawn from the inner surface of the coil winding, moved at a constant speed past a head, and returned to the periphery of the coil, said apparatus having a housing and including a rotatable capstan disposed to be engageable with the tape, a flywheel for rotating the capstan, a pinch roller for pressing the tape against the capstan which thereby drives the tape, said motor being cylindrically shaped with a rotating shaft driven by said motor, a means for transmitting rotary motion from the motor shaft to the flywheel, and an idler wheel for guiding the tape as it is moved through the apparatus, characterized in that the supply reel is rotatably mounted on the motor, said motor being concentrically located in the central aperture of the supply reel.

3. The apparatus of claim 2 further characterized in that the housing comprises at least one printed circuit board containing electronic circuitry and components for processing the signals.

4. The apparatus of claim 3 further characterized in that the reel wall for supporting the inner surface of the tape coil is tapered such that the angle formed by the wall and base is less than a right angle.

5. An apparatus for recording and reproducing signals on a tape according claim 1, wherein said tape is moved at a constant speed past a head from one to another of a supply reel and a take-up reel on which the tape is wound and to which the ends of the tape are attached, said supply reel having an axially extending central aperture, said apparatus having a housing and including a rotatable capstan disposed to be engageable with the tape, a flywheel for rotating the capstan, a pinch roller for pressing the tape against the capstan which thereby drives the tape, said motor being cylindrically shaped with a rotating shaft driven by said motor, a means for transmitting rotary motion from the motor shaft to the flywheel, and an idler wheel for guiding the tape as it is moved through the apparatus, characterized in that the supply reel is rotatably mounted on the motor, said motor being concentrically located in said central aperture of the supply reel.

6. The apparatus of claim 5 further characterized in that the housing enclosing the apparatus comprises at least one printed circuit board containing electronic circuitry and components for processing the signals.

7. An apparatus for recording and reproducing signals on a tape according to claim 1, wherein said tape is moved at a constant speed past a head from one to another of a supply reel and a take-up reel on which the tape is wound and to which the ends of the tape are attached, said take-up reel having an axially extending central aperture, said apparatus having a housing and including a rotatable capstan disposed to be engageable with the tape, a flywheel for rotating the capstan, a pinch roller for pressing the tape against the capstan which thereby drives the tape, said motor being cylindrically shaped with a rotating shaft driven by said motor, a means for transmitting rotary motion from the motor shaft to the flywheel, and an idler wheel for guiding the tape as it is moved through the apparatus, characterized in that the take-up reel is rotatably mounted on the motor, said motor being concentrically located in said central aperture of the take-up reel.

8. The apparatus of claim 7 further characterized in that the housing comprises at least one printed circuit board containing electronics circuitry and components for processing the signals.

9. An apparatus for recording and reproducing signals on a tape according to claim 1, wherein the tape is enclosed in a cassette housing, said cassette also including a supply reel and a take-up reel, said tape being moved at constant speed past a head from one to another of the supply reel and the take-up reel on which the tape is wound and to which the ends of the tape are attached, said supply and take-up reels each having axially extending central apertures, said entire cassette being interchangeable, said recording and reproducing apparatus having a housing and including one or a plurality of rotatable capstans disposed to be engageable with the tape, one or a plurality of flywheels for rotating the capstans, one or a plurality of pinch rollers for pressing the tape against the capstans which thereby drives the tape, one or a plurality of shift wheels disposed to be engageable with other shift wheels or with one or a plurality of passing idlers for transmitting rotary motion from the shift wheels to one or the other of the tape reels, said motor being cylindrically shaped with rotating shaft driven by said motor, a means for transmitting rotary motion from the motor shaft to the flywheels and shift wheels, and one or a plurality of idler wheels for guiding the tape as it is moved through the apparatus, characterized in that either the supply reel or the take-up reel may be rotatably mounted on the motor, said motor being concentrically located in the central aperture of the supply reel, and also being characterized in that the flywheels, the shift wheels, the motor shaft, and the means for transmitting rotary motion from the motor shaft to the flywheels and shift wheels extend to a plane below that of the cassette components so as to allow the cassette to be removed and reattached at will.

10. The apparatus of claim 9, further including at least one printed circuit board containing electronic circuitry and components for processing signals.

11. An audio cassette for use in a compact tape recorder apparatus, which cassette comprises:
a case;
two tape reels for holding audio tape, at least one of said tape reels having a central aperture;

said case including at least one case aperture passing through said case, at least one of said case aperture being aligned with said central aperture of said tape reel, said case aperture having a diameter sufficiently wide to pass a cylindrically shaped motor driving a tape player;

audio tape, connected at one end to said first tape reel and being partially wound on said first reel, connected at the other end to said second tape reel and being partially wound on said second reel, running along a path from said first to said second reel, whereby the tape may move freely in both directions between said first and second reels while moving past sensory encoding and decoding devices, which devices are part of said tape player;

said case including at least one sensory access holes cut into said case allowing access for sensory devices to encode and decode said audio tape;

said case including at least one capstan access holes cut into said case for allowing access for capstans to frictionally drive said tape along said path;

said case including at least one pinch roller access holes cut into said case for allowing access for pinch rollers to frictionally drive said tape along said path.

12. A tape cassette according to claim 11 wherein said tape reels are spatially inverted.

13. A tape cassette according to claim 12, wherein said inverted tape reels have tape reel bases and tape reel walls which overlap to eliminate empty space therebetween.

14. A tape cassette according to claim 11, wherein a first aperture and second aperture have identical dimensions.

15. A tape cassette according to claim 14, wherein said first and second apertures have their radial centers laterally equidistant from an axis running perpendicular to a line connecting said radial centers.

16. A tape cassette according to claim 11 further comprising a notch cut along an edge of said case, said notch allowing access to inside of said case for a drive mechanism to frictionally contact and drive one or both said tape reels.

17. A tape cassette according to claim 11 wherein said tape is wound in an opposite direction on each respective tape reel.

18. A tape cassette according to claim 11 further comprising at least one drive holes cut through said case, which holes allow access for frictional drive mechanisms to contact one or both of said tape reels and impart a driving force to said tape reels.

19. A tape cassette according to claim 11 wherein all parts are placed in a symmetrical manner around an axis allowing the cassette to be employed in a tape player with either side down.

* * * * *